(12) United States Patent
Jiang et al.

(10) Patent No.: US 10,468,201 B2
(45) Date of Patent: Nov. 5, 2019

(54) INTEGRATED SUPER-CAPACITOR

(71) Applicant: Analog Devices, Inc., Norwood, MA (US)

(72) Inventors: Yingqi Jiang, Woburn, MA (US); Kuang L. Yang, Newton, MA (US)

(73) Assignee: Analog Devices, Inc., Norwood, MA (US)

(*) Notice: Subject to any disclaimer, the term of this patent is extended or adjusted under 35 U.S.C. 154(b) by 54 days.

(21) Appl. No.: 14/509,950

(22) Filed: Oct. 8, 2014

(65) Prior Publication Data
US 2016/0104581 A1    Apr. 14, 2016

(51) Int. Cl.
| | |
|---|---|
| H01G 11/26 | (2013.01) |
| H01G 11/36 | (2013.01) |
| H01G 11/28 | (2013.01) |
| H01M 10/42 | (2006.01) |
| H01G 11/78 | (2013.01) |
| H01M 10/04 | (2006.01) |
| H01G 11/08 | (2013.01) |
| H01G 11/68 | (2013.01) |
| H01G 11/70 | (2013.01) |
| H01G 11/74 | (2013.01) |
| H01G 11/82 | (2013.01) |
| H01G 11/04 | (2013.01) |
| H01G 11/56 | (2013.01) |

(Continued)

(52) U.S. Cl.
CPC ............ H01G 11/28 (2013.01); H01G 11/08 (2013.01); H01G 11/26 (2013.01); H01G 11/68 (2013.01); H01G 11/70 (2013.01); H01G 11/74 (2013.01); H01G 11/78 (2013.01); H01G 11/82 (2013.01); H01M 10/04 (2013.01); H01M 10/4257 (2013.01); *H01G 11/04* (2013.01); *H01G 11/36* (2013.01); *H01G 11/56* (2013.01); *H01G 11/58* (2013.01); *H01G 11/86* (2013.01); *Y02E 60/13* (2013.01)

(58) Field of Classification Search
CPC ................................ H01G 11/78; H01G 11/82
USPC ........................................................ 361/502
See application file for complete search history.

(56) References Cited

U.S. PATENT DOCUMENTS

| | | | |
|---|---|---|---|
| 5,079,674 A | 1/1992 | Malaspina | 361/502 |
| 5,439,756 A | 8/1995 | Anani et al. | 429/9 |

(Continued)

FOREIGN PATENT DOCUMENTS

| | | | |
|---|---|---|---|
| CN | 101740823 A | 6/2010 | |
| CN | 202353290 U | 7/2012 | H02J 7/34 |

(Continued)

OTHER PUBLICATIONS

Oakes et al., Surface engineered porous silicon for stable, high performance electrochemical supercapacitors, Scientific Reports 3:3020, Oct. 22, 2013, pp. 1-7, ISSN 2045-2322.22.10.2013.*

(Continued)

*Primary Examiner* — Eric W Thomas
(74) *Attorney, Agent, or Firm* — Wolf, Greenfield & Sacks, P.C.

(57) ABSTRACT

A super-capacitor has a substrate, at least two porous electrodes integrated within the substrate, and an electrolyte extending between the at least two porous electrodes. The electrolyte is integrated with the substrate, and is positioned within the substrate. The at least two porous electrodes and electrolyte are configured to store charge as a super-capacitor.

19 Claims, 12 Drawing Sheets

(51) Int. Cl.
*H01G 11/86* (2013.01)
*H01G 11/58* (2013.01)

(56) References Cited

U.S. PATENT DOCUMENTS

| | | | |
|---|---|---|---|
| 6,117,585 A | 9/2000 | Anani et al. ................ | 429/122 |
| 6,356,432 B1 | 3/2002 | Danel et al. ................ | 361/502 |
| 6,621,687 B2 * | 9/2003 | Lewis, Jr. ............ | H01G 9/155 |
| | | | 361/303 |
| 7,061,749 B2 | 6/2006 | Liu et al. ................. | 361/502 |
| 7,294,209 B2 * | 11/2007 | Shakespeare ...... | G06K 19/0702 |
| | | | 118/729 |
| 7,659,014 B2 | 2/2010 | Sohn ............................ | 429/7 |
| 7,852,612 B2 | 12/2010 | Zhao ......................... | 361/502 |
| 8,503,161 B1 | 8/2013 | Chang et al. .............. | 361/502 |
| 8,697,516 B2 | 4/2014 | Furukawa et al. .......... | 438/240 |
| 8,778,800 B1 | 7/2014 | Chang et al. .............. | 438/685 |
| 2001/0020319 A1 | 9/2001 | Farahmandi et al. ...... | 29/25.03 |
| 2003/0035982 A1 | 2/2003 | Ryu et al. ..................... | 429/7 |
| 2004/0161640 A1 | 8/2004 | Salot ............................ | 429/9 |
| 2004/0185310 A1 | 9/2004 | Jenson et al. ................. | 429/7 |
| 2008/0199737 A1 | 8/2008 | Kazaryan et al. ............ | 429/9 |
| 2010/0195261 A1 | 8/2010 | Sweeney et al. .......... | 361/313 |
| 2010/0328845 A1 | 12/2010 | Hiralal et al. ............. | 361/502 |
| 2010/0330433 A1 | 12/2010 | Amine et al. ............... | 429/302 |
| 2011/0019337 A1 | 1/2011 | Chen et al. ................ | 361/500 |
| 2011/0183180 A1 | 7/2011 | Yu et al. ..................... | 429/128 |
| 2012/0026643 A1 | 2/2012 | Yu et al. ..................... | 361/502 |
| 2012/0092809 A1 * | 4/2012 | Tamachi ............... | H01G 9/155 |
| | | | 361/502 |
| 2012/0216379 A1 | 8/2012 | Martienssen et al. ....... | 29/25.41 |
| 2013/0146957 A1 * | 6/2013 | Cheng ................ | H01L 27/1203 |
| | | | 257/301 |
| 2013/0182373 A1 | 7/2013 | Yu et al. ..................... | 361/502 |
| 2014/0035098 A1 | 2/2014 | Dunn et al. ................. | 257/532 |
| 2014/0321093 A1 * | 10/2014 | Pande .................... | H01G 11/22 |
| | | | 361/807 |

| | | | |
|---|---|---|---|
| 2016/0064149 A1 | 3/2016 | Jiang et al. .......... | H01G 9/0029 |
| 2016/0064155 A1 | 3/2016 | Jiang et al. ............ | H01G 11/52 |
| 2016/0204492 A1 | 7/2016 | Jiang et al. ........... | H01M 16/00 |

FOREIGN PATENT DOCUMENTS

| | | | |
|---|---|---|---|
| CN | 102804301 A | 11/2012 | |
| CN | 202957152 U | 5/2013 | ............. H01G 11/08 |
| CN | 103219162 A | 7/2013 | ............. H01G 11/36 |
| CN | 103608953 A | 2/2014 | |
| JP | 2010161097 A * | 7/2010 | |
| JP | 2012-033899 A | 2/2012 | ............. H01G 11/06 |
| KR | 10-1057410 B1 | 8/2011 | ............. H01G 9/058 |
| KR | 10-1222873 B1 | 1/2013 | ............... H01G 2/06 |
| WO | WO 2013/070989 A1 | 5/2013 | ............. H01G 11/30 |
| WO | WO 2013128082 A1 * | 9/2013 | ............. H01G 11/28 |

OTHER PUBLICATIONS

El-Kady et al., "Scalable fabrication of high-power graphene micro-supercapacitors for flexible and on-chip energy storage," Nature Communications, vol. 4, Article No. 1475, 9 pages, dated Feb. 12, 2013.
Wu et al., "Graphene-based in-plane micro- supercapacitors with high power and energy densities," Nature Communications, vol. 4, Article No. 2487, 8 pages , dated Sep. 17, 2013.
Pech et al., "Research Topics—ISGE," Laboratory for Analysis and Architecture of Systems, https://www.laas.fr/publiden/research-topics-isge, 5 pages, 2014.
Korean Intellectual Property Office Authorized Officer: Kim, Sung Gon, Notification of Transmittal of the International Search Report and the Written Opinion of the International Searching Authority, or the Declaration; PCT/US2015/050102, 11 pages, dated Apr. 29, 2016.
Israel Patent Office Authorized Officer: Orgad, Yaniv, Notification of Transmittal of the International Search Report and the Written Opinion of the International Searching Authority, or the Declaration; PCT/US2015/060530, 10 pages, dated Feb. 25, 2016.

* cited by examiner

INTEGRATED SUPER-CAPACITOR

REFERENCE TO RELATED PATENT APPLICATIONS

This patent application is related to the following patent applications, each of which is incorporated herein, in its entirety, by reference:

U.S. patent application Ser. No. 14/593,230, filed Jan. 9, 2015, entitled, "INTEGRATED CIRCUIT WITH SHARED ELECTRODE ENERGY STORAGE DEVICES," and naming Yingqi Jiang and Kuang L. Yang as inventors, U.S. patent application Ser. No. 14/469,004, filed Aug. 26, 2014, entitled, "METHOD OF PRODUCING A SUPER-CAPACITOR," and naming Yingqi Jiang and Kuang L. Yang as inventors, U.S. patent application Ser. No. 14/492,376, filed Sep. 22, 2014, entitled, "SUPER-CAPACITOR WITH SEPARATOR AND METHOD OF PRODUCING THE SAME," and naming Yingqi Jiang and Kuang L. Yang as inventors,

FIELD OF THE INVENTION

The invention generally relates to super-capacitors and, more particularly, the invention relates to forming reduced profile super-capacitors.

BACKGROUND OF THE INVENTION

Although the size of portable electronic devices continues to shrink, their energy requirements often do not comparably decrease. For example, a next-generation MEMS accelerometer may have a volume that is 10 percent smaller and yet, require are only 5 percent less power than the prior generation MEMS accelerometer. In that case, more of the MEMS die may be used for energy storage. Undesirably, this trend can limit miniaturization and applicability of such electronic devices.

The art has responded to this problem by developing chip-level super-capacitors (also known as "micro super-capacitors"), which have much greater capacitances than conventional capacitors. Specifically, when compared to conventional capacitors and batteries, super-capacitors generally have higher power densities, shorter charging and discharging times, longer life cycles, and faster switching capabilities.

Despite their high capacities, super-capacitors still have further limitations—their heights/profiles often are be relatively large (e.g., due to packaging), and the available area to contain/form them on a die often is scarce.

SUMMARY OF VARIOUS EMBODIMENTS

In accordance with one embodiment of the invention, a super-capacitor has a substrate, at least two porous electrodes integrated within the substrate, and an electrolyte extending between the at least two porous electrodes. The electrolyte is integrated with the substrate, and is positioned within the substrate. The at least two porous electrodes and electrolyte are configured to store charge as a super-capacitor.

The substrate has a maximum dimension in three directions (e.g., in Cartesian coordinates, in the X-direction, Y-direction, and Z-direction). The at least two electrodes preferably are positioned completely within the maximum dimensions of the substrate. The super-capacitor also may have a current collector covering the at least two porous electrodes.

In addition forming a super-capacitor, the substrate may have additional components. For example, the apparatus also may have a MEMS structure formed on and/or in the substrate. In that case, the MEMS structure optionally may be electrically coupled with the at least two porous electrodes, and the at least two porous electrodes and electrolyte are physically spaced from the MEMS structure. Some embodiments, however, may not electrically connect the MEMS structure to the super-capacitor. As another example, the apparatus also may have active circuitry formed on and/or in the substrate. The active circuitry optionally may be electrically coupled with the at least two porous electrodes.

The at least two porous electrodes preferably are spaced apart and generally parallel to each other. Those skilled in the art preferably select appropriate materials for the various components of the super-capacitors. For example, the substrate may include silicon (e.g., single crystal silicon from a silicon wafer), and/or the at least two porous electrodes may include graphene.

The at least two porous electrodes and electrolyte may form a non-straight path within the substrate. This should permit a more optimized use of the substrate volume/area, thus permitting a higher capacity than many straight implementations. For example, the at least two porous electrodes and electrolyte may form a serpentine path within the substrate.

In accordance with another embodiment, an energy storage device has a substrate, at least two electrodes integrated within the substrate, and an electrolyte extending between the at least two electrodes. The electrolyte is integrated with the substrate and positioned within the substrate. The at least two electrodes and electrolyte are configured to store charge (e.g., as a battery or super-capacitor).

In accordance with other embodiments, a method of forming a super-capacitor provides a substrate having an initial outer surface (i.e., before it is significantly etched or before trenches are formed), and then forms at least two porous electrodes within the substrate. The method also forms an electrolyte region, between the at least two electrodes, to receive an electrolyte, and then adds electrolyte to the electrolyte region. In this case, the electrodes and electrolyte preferably are formed to not extend beyond the initial outer surface of the substrate. The method also forms at least two current collectors so that each electrode is in electrical communication with one of the current collectors.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a super-capacitor is formed with a minimal profile, thus reducing the amount of vertical real estate it requires in a larger system, such as a printed circuit board. To those ends, the super-capacitor has at least two electrodes and an electrolyte that do not extend beyond the outer boundaries of its substrate (e.g., a silicon die). In fact, rather than forming a super-capacitor, the same structure is versatile enough to be used as the basis of a battery or other charge storage device. Details of illustrative embodiments are discussed below.

Figure 1A:
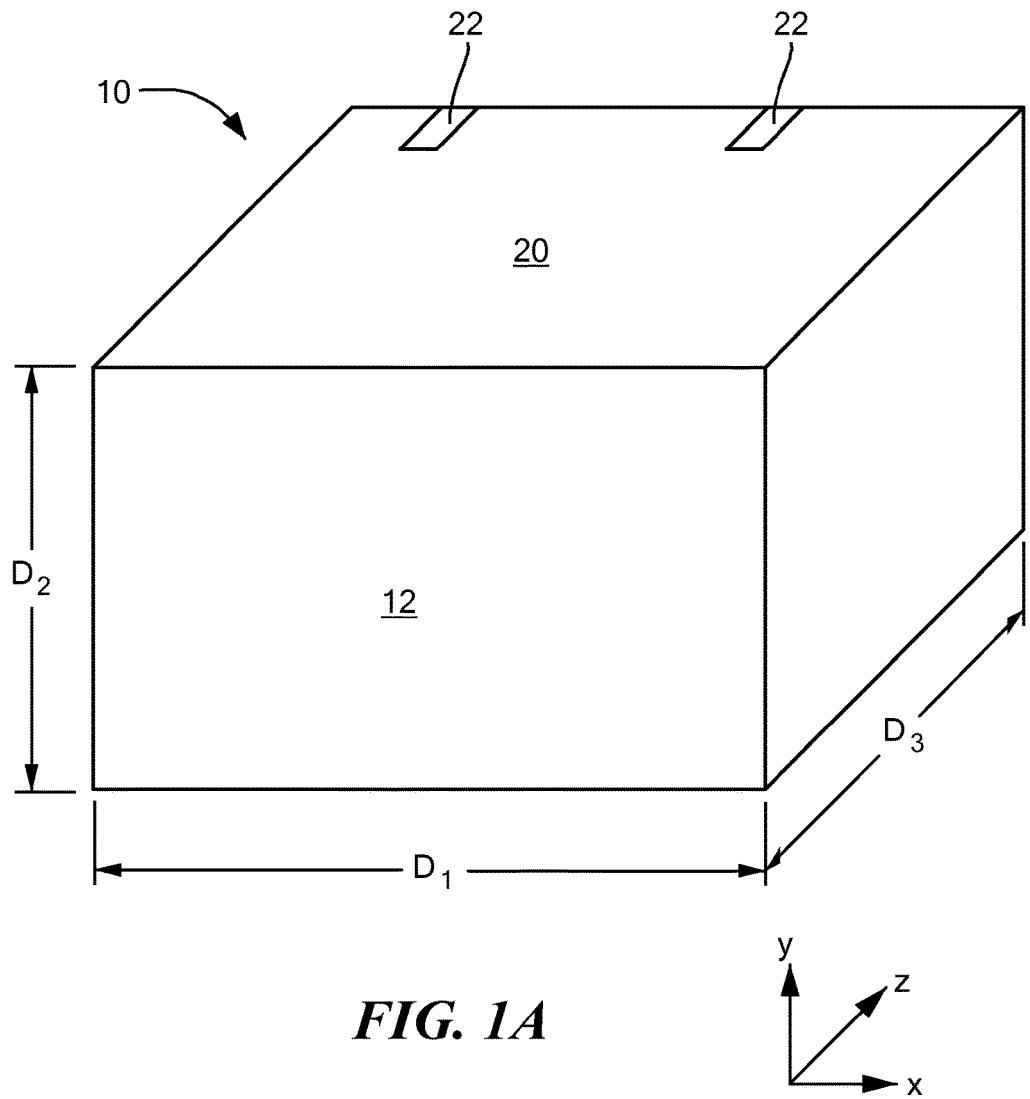
FIG. 1A schematically shows a perspective view of a super-capacitor configured in accordance with illustrative embodiments of the invention.
Figure 1B:
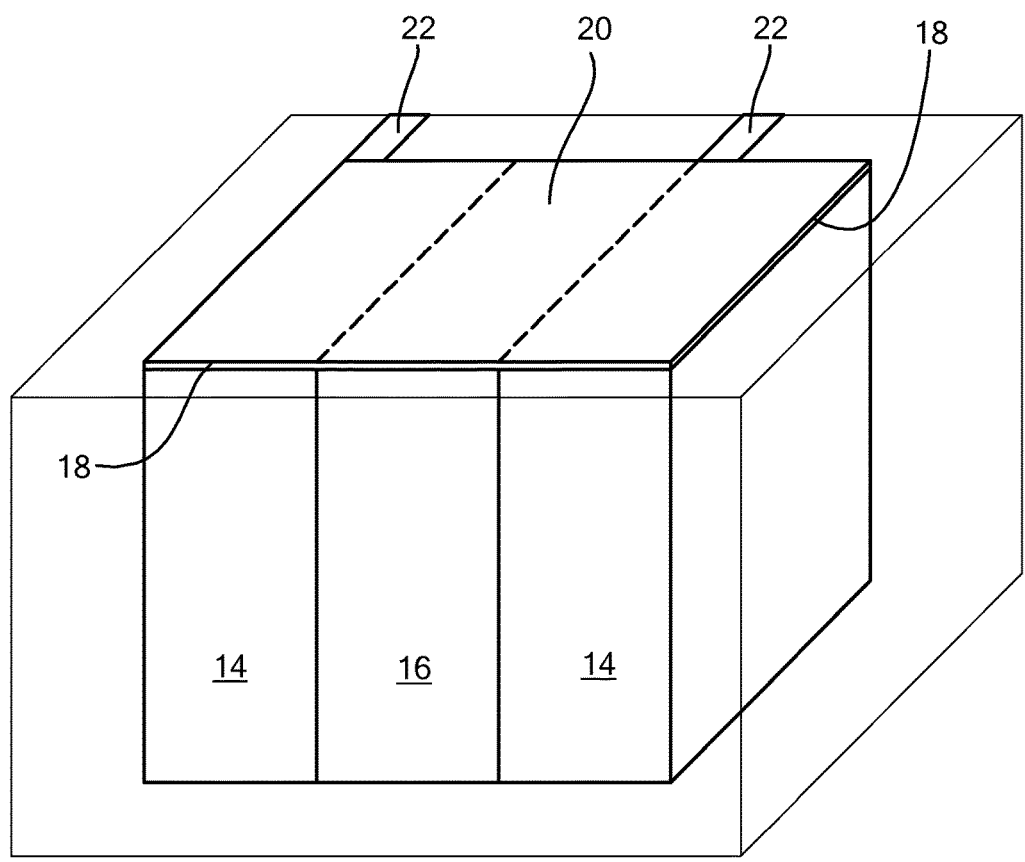
FIG. 1B schematically shows the super-capacitor of FIG. 1A with much of the substrate walls shown as transparent to better show internal components of the super-capacitor.

FIG. 1A schematically shows a perspective view of a micro super-capacitor die (hereinafter "super-capacitor 10") configured in accordance with illustrative embodiments of the invention. FIG. 1B schematically shows the same super-capacitor 10, but with much of its supporting structure made transparent to expressly show some of its internal components. Specifically, the super-capacitor 10 of FIGS. 1A and 1B is a unitary chip-level device having a substrate 12 with a pair of electrodes 14 on each side of an electrolyte material ("electrolyte 16"). Like other super-capacitors, the electrodes 14 and electrolyte 16 cooperate to have the capacity to store a prescribed electrical charge.

The super-capacitor 10 also has a current collector 18 layer to collect charge for the electrodes 14, and a thin passivation/packaging material 20 layer formed over the top of current collectors 18. Each current collector 18 may electrically connect with a pad 22 on one or more of its exposed surfaces to permit electrical communication with electronic components outside of the device.

As noted above, the electrodes 14 and electrolyte 16 are integrated into the substrate 12—they preferably are embedded into the substrate 12 so that they do not extend out of the substrate 12. In other words, the substrate 12 has maximum dimensions in the three dimensions of the Cartesian coordinate system, and the electrodes 14 and electrolyte 16 are within those dimensions. For example, the substrate 12 of the super-capacitor 10 in FIG. 1A has lengths of D1 in the X direction, D2 in the Y direction, and D3 in the Z direction. In that case, the electrodes 14 and electrolyte 16 each have X, Y, and Z dimensions that are substantially equal to or smaller than any one of D1, D2, and D3 in the respective dimensions—preferably the same as or smaller than all three dimensions D1, D2, and D3. The view of FIG. 1B more clearly shows this relationship. Some alternative embodiments, however, may permit a portion of the electrodes 14 or electrolyte 16 to extend beyond one or more of those noted boundaries.

In a similar manner, the passivation 20, current collectors 18 and pads 22 also may be formed to collectively not appreciably extend out of the substrate 12—instead, those components are integrated within or only negligibly extending above the substrate 12. Among other things, the pads 22 preferably permit surface mounting, or bonding with conventional wire-bonds. Accordingly, in that case, the profile of the super-capacitor 10 should not appreciably exceed that of the substrate 12. In other embodiments, however, the current collectors 18, passivation 20, and/or pads 22 do add a small but noticeable additional thickness that exceeds that of the substrate 12. Using the example above, the current collectors 18, passivation 20, and/or pads 22 may cause the overall super-capacitor structure to exceed D1, D2, and/or D3 to some extent. Such embodiments preferably do not appreciably extend beyond those boundaries, thus only adding an insubstantial extra amount to the relevant dimension (e.g., extending it by 2 to 5 percent). Other such embodiments, however, may add substantially to one of the dimensions.

The electrodes 14 may be formed from conventional materials known in the super-capacitor art—preferably a porous solid material. For example, as discussed in greater detail below, the electrodes 14 may be formed from graphene, which is known to be a porous material with tortuous interior and exterior surfaces. Virtually every surface of the electrode 14 exposed to the electrolyte 16 therefore may be considered part of the surface area the capacitor plates represented in the well-known equation:

$$C = \varepsilon \cdot (A/D) \qquad \text{(Equation 1)},$$

where:
C is capacitance,
$\varepsilon$ is a constant,
A is the area, and
D is distance.

Indeed, those skilled in the art can use other materials to form the electrode 14, such as activated carbon, carbon aerogel, or carbon nanotubes, to name but a few. Accordingly, discussion of graphene is by example only and not intended to limit various other embodiments of the invention.

In a similar manner, the electrolyte 16, which is not present in conventional capacitors (i.e., non-super-capacitors, a different device that typically has a dielectric material rather than ionic material), can be formed from any of a wide variety of other corresponding materials. For example, electrolyte 16 can be formed from an aqueous salt, such as sodium chloride, or a gel, such as a polyvinyl alcohol polymer soaked in a salt. Some embodiments may use an ionic liquid, in which ions are in the liquid state at room temperature. Although not necessarily aqueous, such electrolytes 16 are known to be extremely conductive due to the relatively free movement of their ions. The inventors believe that such an electrolyte 16 should produce a super-capacitor 10 with a relatively high energy storage capacity because, as known by those skilled in the art, the energy storage of the capacitor is a function of the square of the voltage.

As noted, the electrolyte 16 preferably is generally integrated with both the internal and external surfaces of the electrodes 14. Among other things, the internal surfaces may be formed by tortuous internal channels and pores within the electrodes 14. The external surfaces simply may be those surfaces visible from the electrode exteriors. The electrolyte 16 and noted electrode surfaces thus are considered to form an interface that stores energy.

Depending upon the electrode material, electrons can flow somewhat freely within the electrodes 14. For example, electrons can flow within graphene. The electrolyte 16, however, acts as an insulator and thus, does not conduct the electrons from the electrodes 14. In a corresponding manner, the ions in the electrolyte 16 can migrate somewhat freely up to the interfaces with the electrodes 14. Like electrons in the electrodes 14, ions in the electrolyte 16 do not migrate through that interface.

When subjected to an electric field, ions within the electrolyte 16 migrate to align with the electric field. This causes electrons and holes in the electrodes 14 to migrate in a corresponding manner, effectively storing charge. For example, in a prescribed electric field, positive ions in the electrolyte 16 may migrate toward a first electrode surface (e.g., the right facing surface of the left electrode 14 of FIG. 1B), and the negative ions in the electrolyte 16 may migrate toward a second electrode surface (e.g., the left facing surface of the right electrode 14 of FIG. 1B). In that case, the positive ions near the first electrode surface attract electrons (in the electrode 14) toward that interface, while the negative ions near the second electrode surface attract holes (in the electrode 14) for that interface. The distance of the ions to the interface plus the distance of the electrons, or holes, to the same interface (on the opposite side of the interface) represent distance "d" of Equation 1 above.

Although useful as an electrode material, graphene still does not have optimal conductivity properties. Accordingly, illustrative embodiments also form the noted current collector 18 and pads 22 on or as part of the substrate 12 to provide exterior access to the electrodes 14. Among other things, the current collector 18 may be formed from a highly conductive metal, such as gold, or a highly doped semiconductor, such as polysilicon. Those skilled in the art can select other materials for this purpose.

Figure 2:
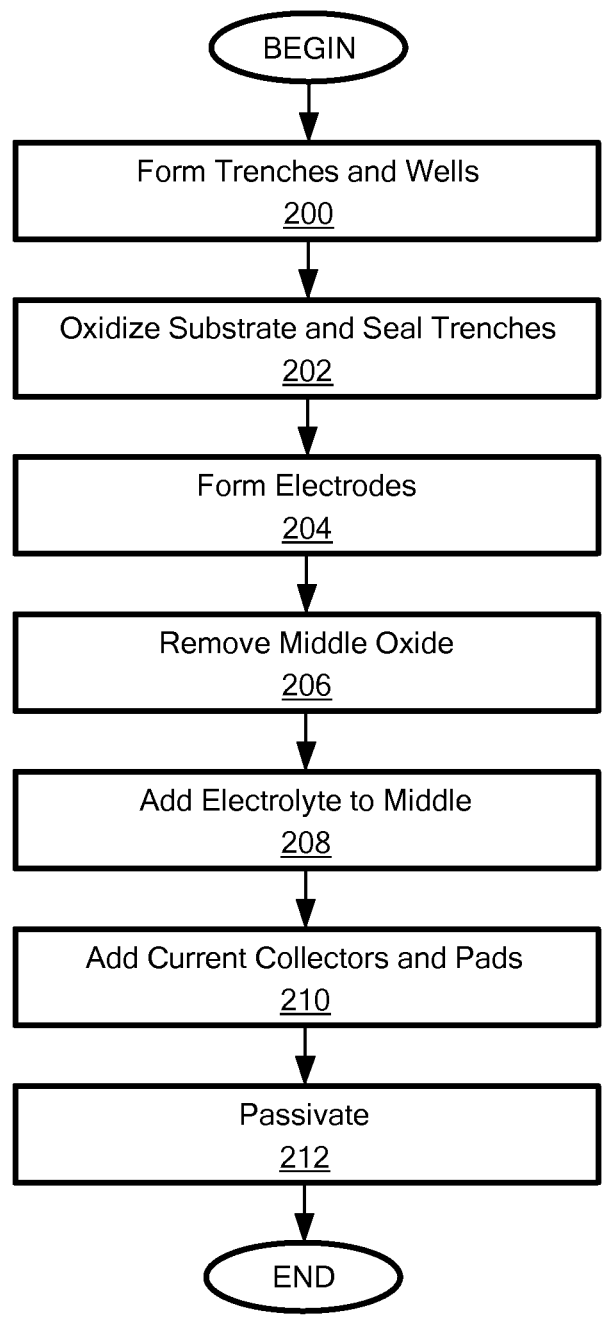
FIG. 2 shows a process of forming the super-capacitor of FIG. 1A in accordance with illustrative embodiments of the invention.

FIG. 2 shows a process of fabricating the super-capacitor 10 of FIGS. 1A and 1B in accordance with illustrative embodiments of the invention—using micromachining processes as one of any of a variety of techniques. Those skilled in the art may use other manufacturing technologies, such as printing. Accordingly, discussion of micromachining is not intended to limit various embodiments.

It should be noted that this process is substantially simplified from a longer process that normally would be used to form the super-capacitor 10. Accordingly, the process of forming the super-capacitor 10 has many steps, such as testing steps, etching steps, or additional passivation steps, which those skilled in the art likely would use. In addition, some of the steps may be performed in a different order than that shown, or at the same time. Those skilled in the art therefore can modify the process as appropriate. Moreover, as noted above and below, many of the materials and structures noted are but one of a wide variety of different materials and structures that may be used. Those skilled in the art can select the appropriate materials and structures depending upon the application and other constraints. Accordingly, discussion of specific materials and structures is not intended to limit all embodiments.

The process of FIG. 2 preferably uses bulk micromachining techniques, which form a plurality of super-capacitors 10 on the same wafer/base at the same time. Although much less efficient, those skilled in the art can apply these principles to a process that forms only one super-capacitor 10.

The process of FIG. 2 begins at step 200, in which micromachining processes form a plurality of trenches 24 and wells 26 in a die/substrate 12 (i.e., in a bulk process, a die 12 in this description is a portion of a wafer that those in the art recognize ultimately will form a single device). In forming the trenches 24 and wells 26, the process effectively forms a plurality of walls defining open voids within the die 12. More specifically, the region 28 between the two wells 26, preferably has a plurality of thin walls that, as discussed below, will be fully oxidized in a later step to form a larger void for receiving the electrolyte 16.

At this stage, the die 12 is considered to have an initial outer surface before forming the trenches 24 and wells 26. As noted above, the electrodes 14 and/or electrolyte 16 of the finished product preferably do not extend beyond this initial surface. Other embodiments may form the trenches 24 and wells 26, however, and then modify the die 12 to remove its initial outer surface. For example, those embodiments may form the trenches 24 and wells 26, and then remove a top layer of the die 12. In this case, the new outer surface may be considered the "initial outer surface." Specifically, when the die 12 is formed with the super-capacitor 10, the surface against which the electrode 14 and/or electrolyte height/dimensions are compared may be considered to be the initial outer surface—regardless of whether it was there at the beginning of the process.

Figure 3A:
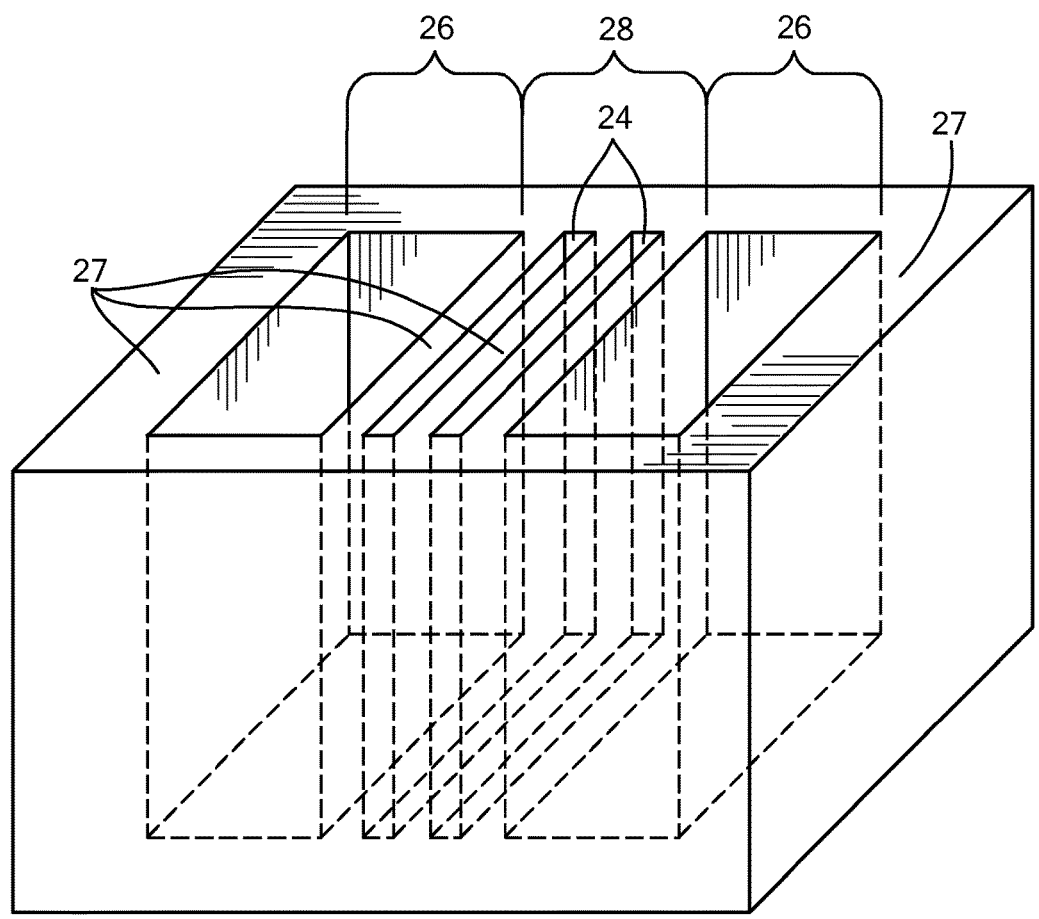
FIGS. 3A-3C schematically show different views of the super-capacitor at step 202 of the process of FIG. 2. The surrounding silicon in FIGS. 3A and 4-8 is omitted to better show the internal structures. The surrounding oxide is shown in exaggerated form to better show that portion of the device.

The die 12 may be formed from any of a variety of materials, such as silicon, silicon-on-insulator ("SOI"), polymethyl methacrylate ("PMMA"), polydimethylsiloxane ("PDMS"), or other rigid or flexible materials. Illustrative embodiments use a bulk silicon wafer. In this context, the wells 26 ultimately will contain the electrodes 14, while the trenches 24, when their walls are oxidized, ultimately will combine to contain the electrolyte 16. FIG. 3A schematically shows the wells 26 and trenches 24 within a portion of the die 12. Although this and related figures only show oxidized portions 27, wells 26, trenches 24, electrodes 14, electrolyte 16, etc., they do not show the die 12 (for simplicity purposes).

Figure 3C:
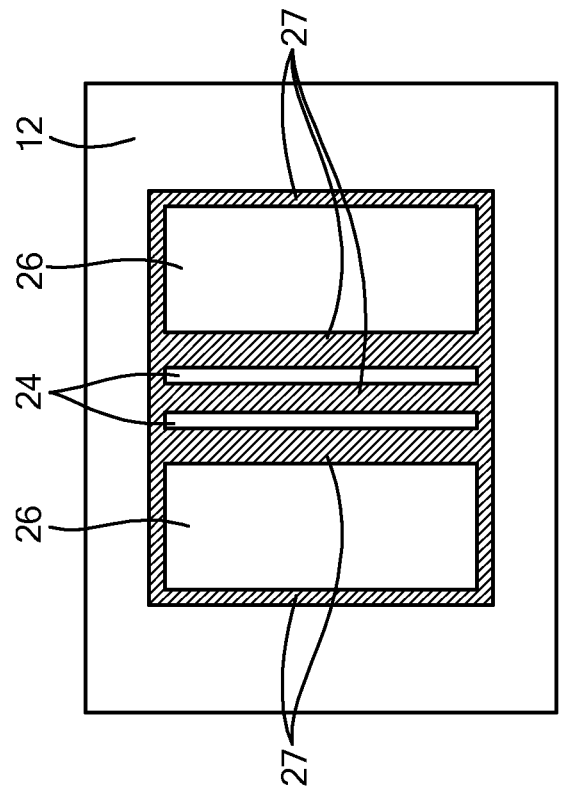
Figure 3B:
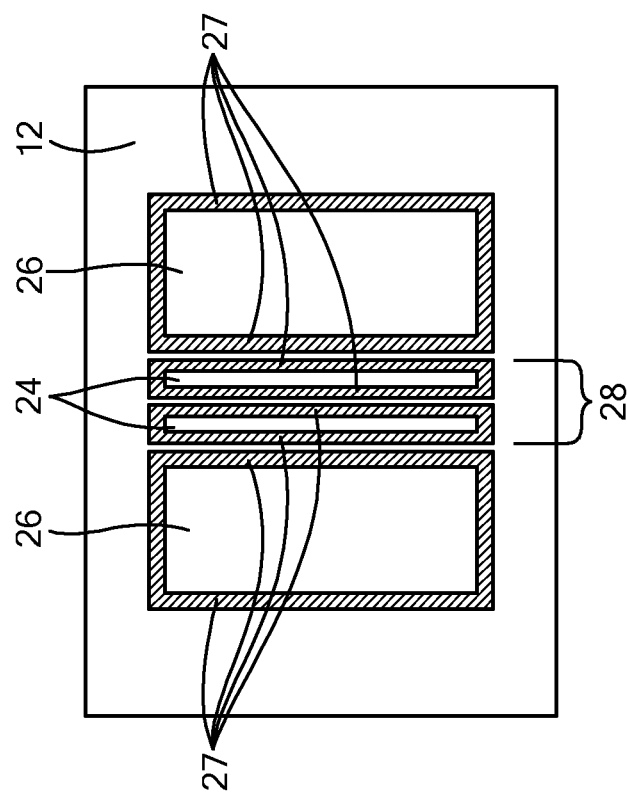

More specifically, the process oxidizes and seals the trenches 24 (step 202). To that end, micromachining processes may fully thermally oxidize the entire die 12 so that the resulting silicon oxide can uniformly grow on all exposed surfaces. Silicon oxide is generally identified in the figures by reference number 27. FIGS. 3B and 3C show the oxidation process in greater detail from a cross-sectional view in the horizontal direction. Specifically, as shown in FIG. 3B, among other places, the oxide 27 initially grows on the internal walls of the trenches 24 in the general middle region 28 of the die 12 (i.e., between the wells 26). Accordingly, at this point in the process, substrate material/walls (i.e., silicon in this example) separate(s) the trenches 24 from each other, and from the wells 26.

FIG. 3C shows the oxidation process at a later point in the process. As shown, the silicon oxide 27 in the middle region 28 completely oxidizes the silicon/walls between the trenches 24. In addition, the silicon oxide 27 completely oxidizes the silicon/walls between the trenches 24 and wells 26. Accordingly, at this point, only silicon oxide 27 is positioned between the two wells 26.

Illustrative embodiments, however, may permit the silicon oxide 27 to continue oxidizing the silicon in the die longer than the time required to oxidize the silicon between the wells 26. For example, although it may take 30 minutes to oxidize the silicon between the wells 26, the thermal oxidation process may continue oxidizing silicon surrounding the wells 26 for another 3 hours; namely, the silicon next to and below the wells 26. FIG. 3A schematically shows the wells 26, trenches 24, and oxidized die portion surrounding each of those regions. FIG. 3A does not show the rest of the silicon die 12, which extends beyond the oxidized regions shown.

After the thermal oxidation process is completed, the trenches 24 still are present, thus forming a void in the middle of the die 12. To facilitate processing, step 202 may conclude by an oxide deposition (e.g. plasma-enhanced chemical vapor deposition, PECVD) of a shallow oxide. In the trenches 24, the oxide quickly seals the openings of those narrow gaps before the oxide enters the insides of the trenches. As a result, most of the trench space remains a void. In contrast, in the wells 26, since their openings are so large, this oxidation step does not seal the wells and thus, they remain open.

Figure 4:
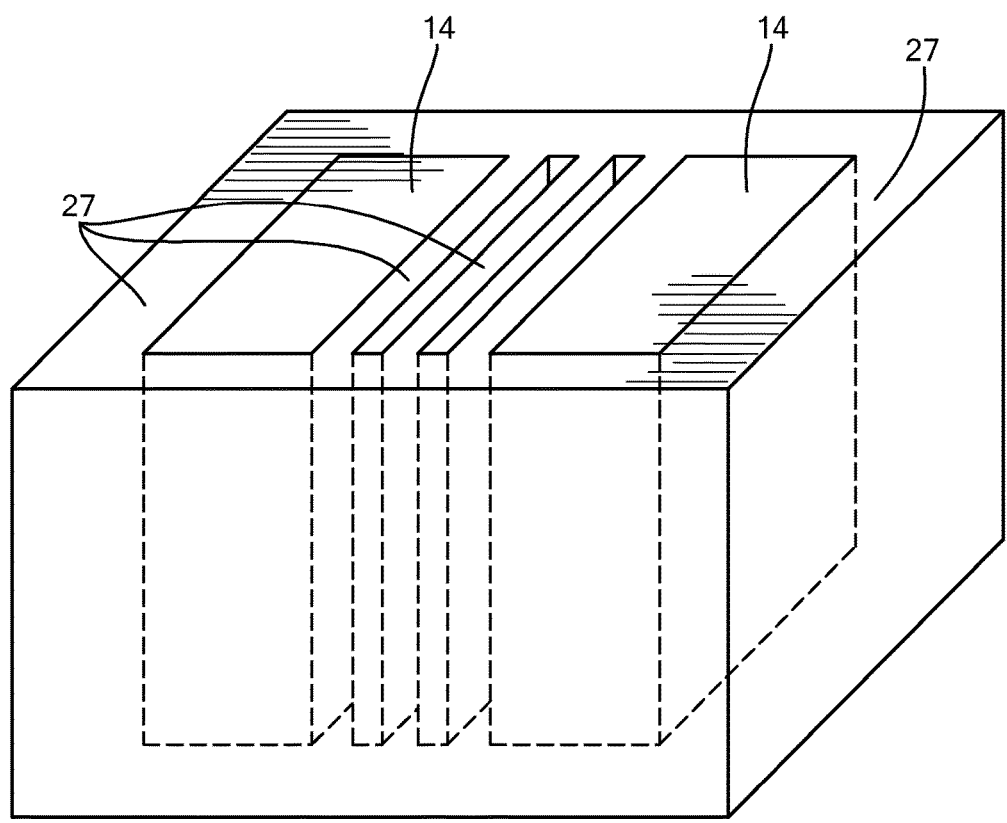
FIG. 4 schematically shows a portion of the super-capacitor at step 204 of FIG. 2.

The process continues to step 204, which forms the electrodes 14. To that end, conventional micromachining processes may fill the two wells 26 with electrode material, such as a graphene suspension. Illustrative embodiments permit the graphene suspension to air dry, thus forming electrode blocks. As noted above, the electrodes 14 preferably do not extend beyond the profile of the die 12. FIG. 4 schematically shows the device at this stage of the process. Alternative embodiments may form the electrodes 14 using other techniques, such as by assembling pre-made graphene blocks in the wells 26.

Figure 5A:
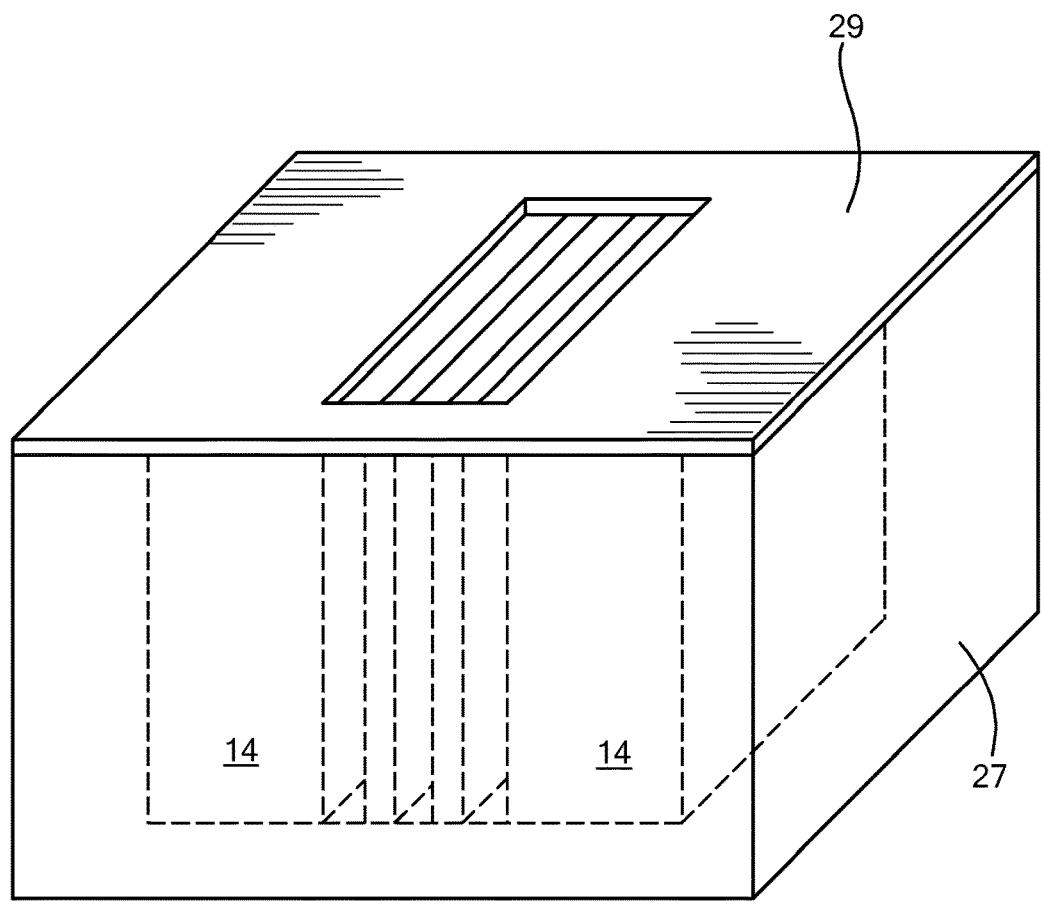
FIGS. 5A-5B schematically show a portion of the super-capacitor at step 206 of FIG. 2.
Figure 5B:
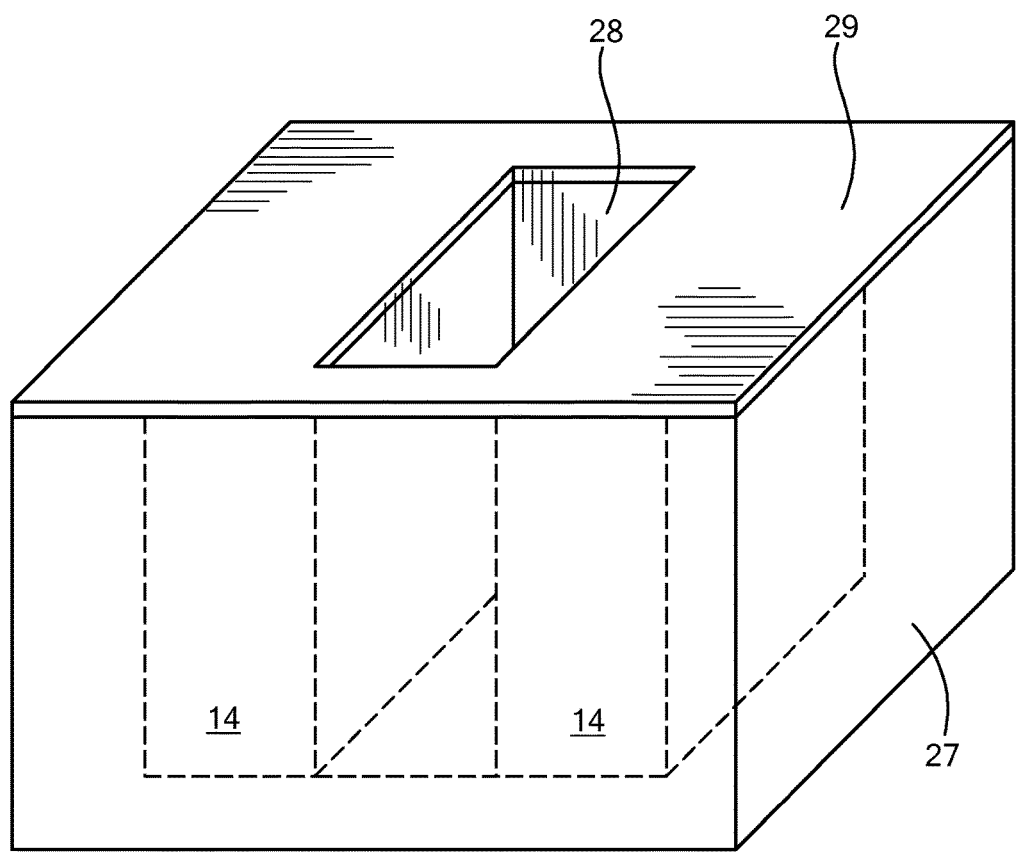

Now that the electrodes 14 are integrated into the die 12, the process begins to form the electrolyte 16 between the electrodes 14. To that end, step 206 removes the middle oxide 27 from the die 12 to form an open chamber. Specifically, as shown in FIG. 5A, the process first forms a photoresist mask 29 on the top surface of the die 12, covering both of the electrodes 14 but exposing the middle oxide 27. Next, as shown in FIG. 5B, this step performs a timed etching through the opening in the mask 29, preferably fully removing most or all of the silicon oxide 27 in the middle area. This step, however, preferably does not remove oxide 27 outside of that region.

Figure 6:
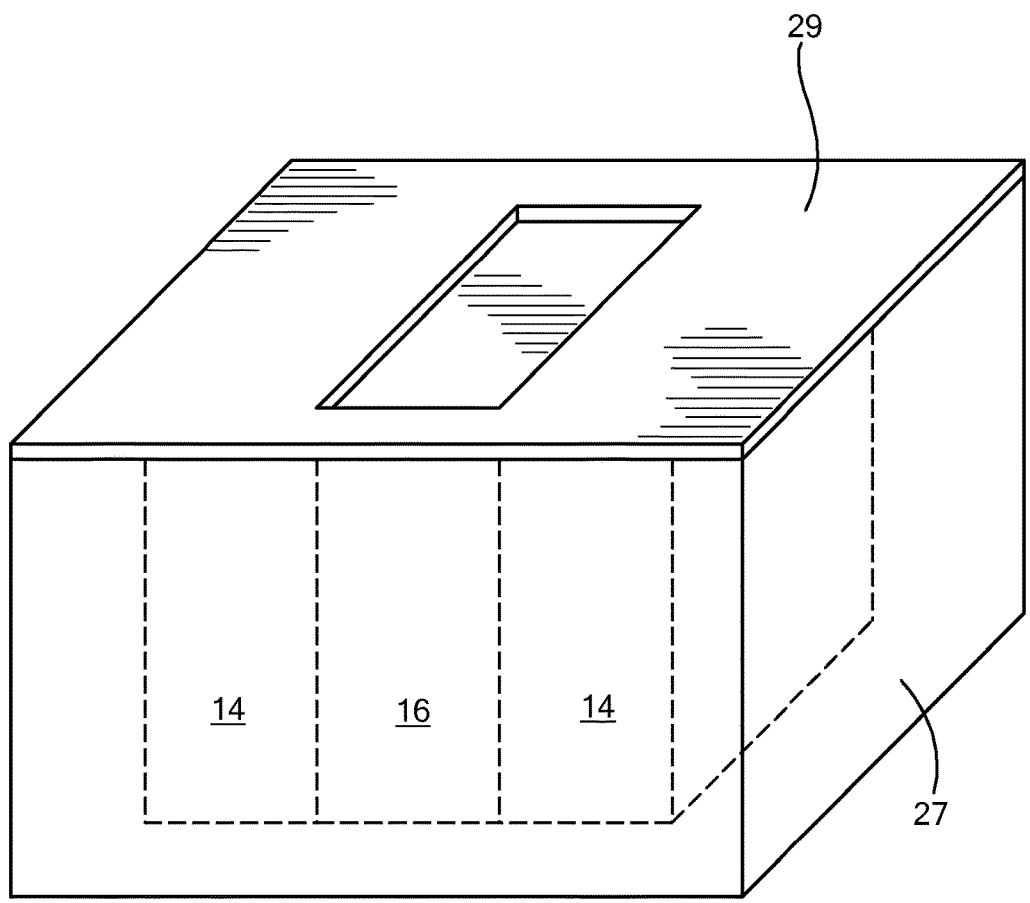
FIG. 6 schematically shows a portion of the super-capacitor at step 208 of FIG. 2.

Accordingly, step 206 concludes by forming the noted open chamber for receiving electrolyte 16. Some embodiments optionally may form a separator (not shown) on the walls of the open chamber; preferably on the side walls of the electrodes 14 in the chamber. In illustrative embodiments, the separator is formed from an ion-penetrating polymer. The process therefore continues to step 208, which adds electrolyte 16 to that open chamber. As shown in FIG. 6, the electrolyte 16 preferably is added through the opening in the mask 29. Illustrative embodiments use vacuum infiltration to better integrate the electrolyte 16 with the electrodes 14, and then permit the electrolyte 16 to cure into a gel. Again, as noted above, other electrolytes may be used and thus, discussion of the specific type of electrolyte is for illustrative purposes only.

Figure 7:
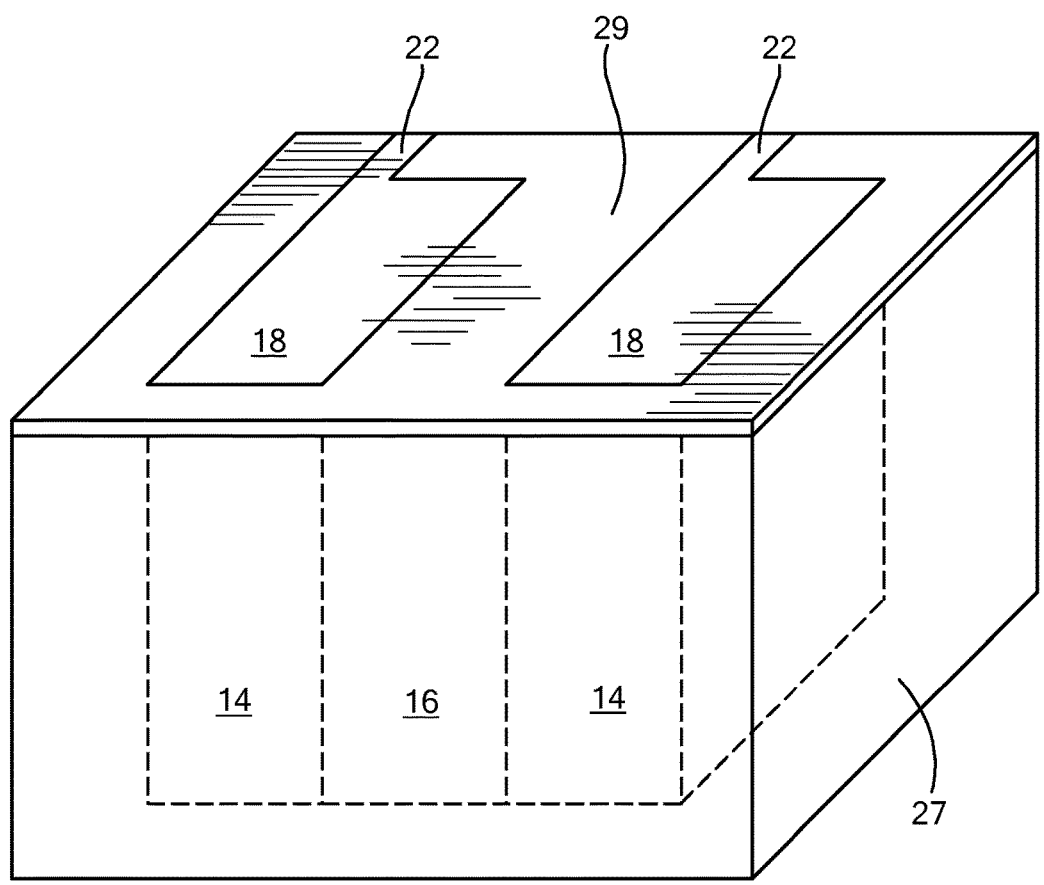
FIG. 7 schematically shows a portion of the super-capacitor at step 210 of FIG. 2.
Figure 8:
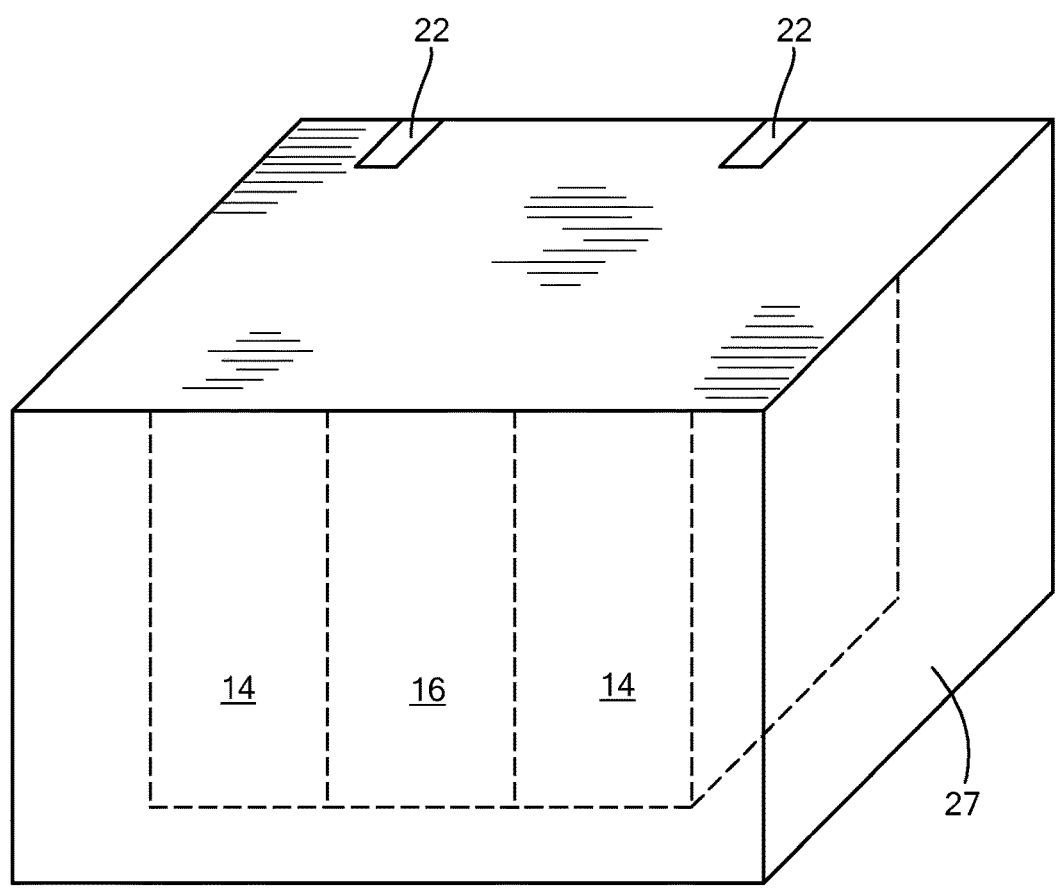
FIG. 8 schematically shows a portion of the super-capacitor at step 212 of FIG. 2.

Step 210 adds the current collectors 18 and pads 22 to the top surface of the die 12 (FIG. 7). To that end, illustrative embodiments remove the mask 29 shown in FIG. 6, and form a new mask 27 over the top of the die 12 in its place. This time, however, the mask exposes the electrodes 14, and covers the rest of the top surface. Next, this step deposits a conductive metal, such as gold, forming the current collectors 18 and pads 22. As shown, the current collectors 18 and pads 22 preferably are in electrical contact. In this case, the current collectors 18 and pads 22 formed of a substantially unitary layer of material.

The process concludes at step 212, which passivates the top surface, effectively electrically insulating most of the entire top surface of the super-capacitor 10. In illustrative embodiments, this passivation step covers every part of the primary portions of the super-capacitor 10 on the top surface except for the pads 22. Accordingly, among other things, the passivation 20 insulates both the electrolyte 16 and current collectors 18. In illustrative embodiments, this step uses silicon oxide to passivate the top surface. Some skilled in the art may refer to this step as forming an in-situ package. After completing this step, conventional processes may perform further steps, such as dicing/cutting the wafer, testing, etc.

Accordingly, the inventors discovered that micromachining techniques can effectively form a super-capacitor 10 substantially completely within the interior of a single substrate 12 or die 12. Rather than limiting all embodiments to super-capacitors 10, however, the inventors further discover that they could extend illustrative embodiments to operate as batteries. Some embodiments therefore relate to batteries having substantially the same structure.

Figure 9:
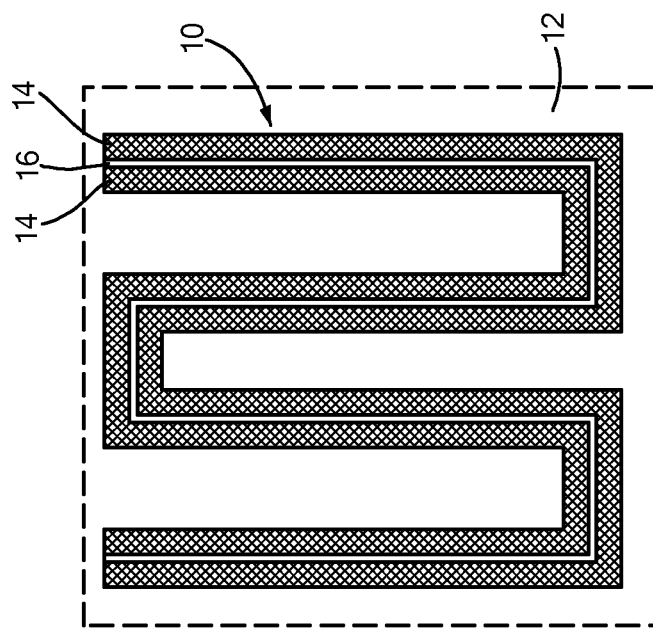
FIG. 9 schematically shows an embodiment of the super-capacitor in which the electrodes and electrolyte are in a non-straight configuration—a serpentine shape in this example.

In fact, various embodiments form the super capacitor 10 within the die 12 in a tortuous manner, extending the length and, consequently, the area making up the super-capacitor 10. FIG. 9 schematically shows one example of such a design, in which the electrodes 14 and electrolyte 16 are not straight. Instead, they may curve or change direction within the die 12. FIG. 9 shows an example of a serpentine shape, where the electrodes 14 are spaced apart and generally parallel to each other. Indeed, those skilled in the art can use other shapes and arrangements to provide a similar result.

Figure 10:
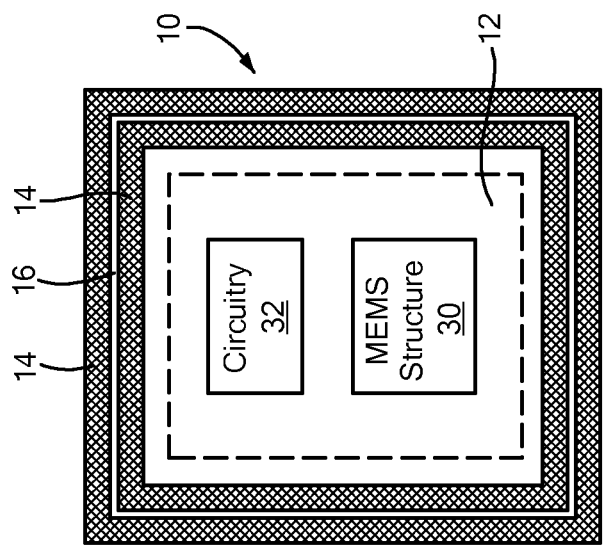
FIG. 10 schematically shows an embodiment of the super-capacitor having circuitry and/or a MEMS device on the same die/substrate.

Some embodiments simply have the super-capacitor 10 on the die 12 with no other components. Other embodiments, however, may have other circuit and structural components integrated into the same die 12 having the super-capacitor 10. FIG. 10, for example, shows one embodiment in which the die 12 has a MEMS device 30, with its attendant MEMS structure, and a super-capacitor 10. The MEMS device 30 may be configured to implement any of a variety of MEMS devices known in the art. For example, the MEMS device 30 may implement a gyroscope, accelerometer, microphone, pressure sensor, temperature sensor, chemical sensor, resonators, actuators, etc.

In this case, the MEMS structure of the MEMS device 30 is surrounded by the super-capacitor 10. Of course, FIG. 10 is but one example of many implementations of dies 12 having both MEMS structures and super capacitors. For example, the MEMS structure could be on radially outward of the super capacitor on the die 12. Alternatively, the MEMS structure and super-capacitor 10 could be on opposite sides of the die 12, or randomly arranged. Some embodiments may have multiple super-capacitors 10 on the same die 12, with or without MEMS structure.

The implementation on FIG. 10 also can include active and/or passive circuitry 32 that cooperates with the super-capacitor 10 (or battery) on a single die 12. Accordingly, such a die 12 would have one or more MEMS devices 30, circuitry 32, and one or more super-capacitors 10. Some embodiments, however, may have just circuitry 32 (active and/or passive) along with one or more super-capacitors 10. In such embodiments, the circuitry 32 could draw some power from the super-capacitor 10.

The inventors note that they envision additional implementations. For example, rather than a super-capacitor 10 with 2 electrodes 14 and one electrolyte 16, some embodiments may have more layers of alternating electrodes 14 and electrolytes 16. Such an implementation may have three electrodes 14 with two electrolytes 16 (i.e., in this order:

electrode-electrolyte-electrode-electrolyte-electrode), ten electrodes 14 and nine electrolytes 16 (similar structure, but with more electrodes/electrolytes), etc. This stacking arrangement can enhance the charge storage capabilities of the super-capacitor 10.

Although the above discussion discloses various exemplary embodiments of the invention, it should be apparent that those skilled in the art can make various modifications that will achieve some of the advantages of the invention without departing from the true scope of the invention.

What is claimed is:

1. A super-capacitor comprising:
    a die having a top surface and a bottom surface;
    first and second electrodes, entirely composed of a porous carbon-based material distinct from the die, integrated within the die, each of the first and second electrodes forming a vertically disposed layer that follows a path horizontally through the die; and
    an electrolyte integrated with the die and extending between the first and second electrodes to form a vertically disposed layer of electrolyte sandwiched between the first and second electrodes, the first and second electrodes and the electrolyte configured to store charge as a super-capacitor.

2. The super-capacitor as defined by claim 1, wherein the die has a maximum dimension in each of three directions and the first and second electrodes are positioned completely within the maximum dimensions of the die.

3. The super-capacitor as defined by claim 1, further comprising a current collector covering the first and second electrodes.

4. The super-capacitor as defined by claim 1, wherein the first and second electrodes are spaced apart and generally parallel to each other.

5. The super-capacitor as defined by claim 1, wherein the super-capacitor further comprises an insulative layer separating a silicon substrate and the first and second electrodes.

6. The super-capacitor as defined by claim 1, wherein the first and second electrodes and the electrolyte form a non-straight path within the die.

7. The super-capacitor as defined by claim 6, wherein the first and second electrodes and electrolyte form a serpentine path within the die.

8. The super-capacitor as defined by claim 1, comprising a microelectromechanical systems (MEMS) structure formed on and/or in the die, the MEMS structure being electrically coupled with the first and second electrodes, the first and second electrodes and electrolyte being spaced from the MEMS structure.

9. The super-capacitor as defined by claim 1, wherein the first and second electrodes comprise graphene and the die comprises silicon.

10. The super-capacitor as defined by claim 1, further comprising active circuitry formed on and/or in the die, the active circuitry being electrically coupled with the first and second electrodes.

11. An energy storage device comprising:
    a die having a top surface and a bottom surface;
    first and second electrodes, entirely composed of a porous material distinct from the die, integrated within the die, each of the first and second electrodes forming a vertically disposed layer that follows a path horizontally through the die;
    a vertically disposed layer of electrolyte integrated with the die and extending between the first and second electrodes,
    the first and second electrodes and the layer of electrolyte being configured to store charge; and
    a separator between at least one of the first or second electrodes and the layer of electrolyte.

12. The energy storage device as defined by claim 11, wherein the first and second electrodes and the layer of electrolyte are configured to store charge as a battery.

13. The energy storage device as defined by claim 11, wherein the energy storage device further comprises an insulative layer separating a silicon substrate and the first and second electrodes.

14. The energy storage device as defined by claim 11, wherein the first and second electrodes and the layer of electrolyte form a non-straight path within the die.

15. The energy storage device as defined by claim 11, further comprising one or both of a microelectromechanical systems (MEMS) device and active circuitry on and/or in the die.

16. The energy storage device as defined by claim 11, wherein the first and second electrodes are spaced apart and generally parallel to each other.

17. The energy storage device as defined by claim 11, comprising a microelectromechanical systems (MEMS) structure formed on and/or in the die, the MEMS structure being electrically coupled with the first and second electrodes, the first and second electrodes and the layer of electrolyte being spaced from the MEMS structure.

18. The energy storage device as defined by claim 11, wherein the first and second electrodes comprise graphene and the die comprises silicon.

19. The energy storage device as defined by claim 11, wherein the first and second electrodes are entirely composed of a carbon-based material.

* * * * *